(12) United States Patent
Leroy et al.

(10) Patent No.: US 9,030,073 B2
(45) Date of Patent: May 12, 2015

(54) CLAW ROTOR EQUIPPED WITH INSULATOR FOR AN EXCITATION COIL AND MAGNETS, AND ROTARY ELECTRICAL MACHINE EQUIPPED WITH ROTOR OF THIS TYPE

(75) Inventors: Virginie Leroy, Neuilly sur Marne (FR); Vincent Foveau, Paris (FR)

(73) Assignee: Valeo Equipements Electriques Moteur, Créteil Cedex (FR)

( * ) Notice: Subject to any disclaimer, the term of this patent is extended or adjusted under 35 U.S.C. 154(b) by 424 days.

(21) Appl. No.: 13/505,397

(22) PCT Filed: Oct. 8, 2010

(86) PCT No.: PCT/FR2010/052132
§ 371 (c)(1),
(2), (4) Date: Sep. 13, 2012

(87) PCT Pub. No.: WO2011/058254
PCT Pub. Date: May 19, 2011

(65) Prior Publication Data
US 2013/0009504 A1    Jan. 10, 2013

(30) Foreign Application Priority Data
Nov. 13, 2009  (FR) ..................... 09 57988

(51) Int. Cl.
*H02K 3/32*   (2006.01)
*H02K 21/12*  (2006.01)
*H02K 3/52*   (2006.01)

(52) U.S. Cl.
CPC ............... *H02K 3/528* (2013.01); *H02K 3/325* (2013.01)

(58) Field of Classification Search
CPC ............................... H02K 3/325; H02K 3/528
USPC ............................................. 310/156.66, 263
See application file for complete search history.

(56) References Cited

U.S. PATENT DOCUMENTS

| | | | | |
|---|---|---|---|---|
| 4,874,977 A | * | 10/1989 | Safranek | 310/269 |
| 5,539,265 A | * | 7/1996  | Harris et al. | 310/263 |
| 5,900,688 A | * | 5/1999  | Kreuzer et al. | 310/194 |
| 6,150,746 A | * | 11/2000 | Lechner | 310/181 |
| 6,369,486 B1 | * | 4/2002  | Armiroli et al. | 310/263 |

(Continued)

FOREIGN PATENT DOCUMENTS

| | | |
|---|---|---|
| JP | 2002 223551 | 8/2002 |
| WO | WO 96/11523 | 4/1996 |

*Primary Examiner* — Alex W Mok
(74) *Attorney, Agent, or Firm* — Berenato & White, LLC

(57) ABSTRACT

The claw rotor (2) comprises: an axial symmetry axis (X-X); two magnet wheels having a core and teeth (9); insulation (11') for a field coil (10) mounted onto the core; and permanent magnets mounted between two adjacent teeth (9) belonging to one and the other of the magnet wheels, wherein the insulation (11') comprises a hub and a flange on each end of the hub (110), each flange having a plurality of projecting petals for engaging with the angled inner periphery (90) of a tooth (9). At least some petals of a flange (120) corresponding to the permanent magnets (38) are split into a plurality of portions, namely, a main petal (121a) for engaging with the inner periphery (90) of a tooth of the magnet wheel (8) in question and at least one side secondary petal (121b) that is lower, when seen in the radial direction, than the main petal. The rotating electrical machine comprises such a rotor. The invention is of use in a claw rotor for motor vehicle alternator or alterno-starter.

16 Claims, 6 Drawing Sheets

(56) References Cited

U.S. PATENT DOCUMENTS

| | | | |
|---|---|---|---|
| 6,426,581 B1* | 7/2002 | York et al. | 310/263 |
| 6,777,845 B2* | 8/2004 | York et al. | 310/194 |
| 6,888,271 B2* | 5/2005 | York | 310/49.32 |
| 7,038,347 B2* | 5/2006 | Militello et al. | 310/194 |
| 7,053,515 B2* | 5/2006 | Nakanishi et al. | 310/194 |
| 2002/0167233 A1* | 11/2002 | Kondo | 310/71 |
| 2003/0137208 A1* | 7/2003 | York et al. | 310/194 |
| 2003/0137212 A1* | 7/2003 | Militello et al. | 310/263 |
| 2004/0066108 A1* | 4/2004 | York | 310/194 |
| 2007/0114879 A1* | 5/2007 | Maeda et al. | 310/263 |
| 2007/0188044 A1* | 8/2007 | Utsumi et al. | 310/263 |
| 2007/0267936 A1* | 11/2007 | York | 310/263 |
| 2007/0286753 A1* | 12/2007 | Ihle et al. | 417/423.7 |
| 2007/0294878 A1* | 12/2007 | Tokizawa | 29/598 |
| 2008/0040912 A1* | 2/2008 | Aeschlimann | 29/598 |
| 2008/0079330 A1* | 4/2008 | Ishida et al. | 310/263 |
| 2008/0315714 A1* | 12/2008 | Badey et al. | 310/261 |
| 2008/0315716 A1* | 12/2008 | Itoh et al. | 310/263 |
| 2010/0013351 A1* | 1/2010 | Gas et al. | 310/263 |
| 2010/0019607 A1* | 1/2010 | Neet et al. | 310/195 |

\* cited by examiner

CLAW ROTOR EQUIPPED WITH INSULATOR FOR AN EXCITATION COIL AND MAGNETS, AND ROTARY ELECTRICAL MACHINE EQUIPPED WITH ROTOR OF THIS TYPE

CROSS-REFERENCE TO RELATED APPLICATIONS AND CLAIM TO PRIORITY

This application is a national stage application of International Application No. PCT/FR2010/052132 filed Oct. 8, 2010, which claims priority to French patent application Ser. No. 09/57988 filed Nov. 13, 2009, of which the disclosures are incorporated herein by reference and to which priority is claimed.

FIELD OF THE INVENTION

The invention relates to a claw rotor provided with an insulator for an excitation coil and permanent magnets, and a rotary electrical machine equipped with a rotor of this type.

PRIOR ART

Numerous rotary electrical machines are equipped with a claw rotor provided with an insulator for an excitation coil and permanent magnets.

In FIG. 1, a machine of this type is described hereinafter in the form of a compact polyphase alternator, in particular for a motor vehicle. This alternator transforms mechanical energy into electrical energy, and can be reversible. A reversible alternator of this type is known as an alternator-starter, and according to another embodiment it transforms electrical energy into mechanical energy, in particular in order to start the thermal engine of the vehicle.

This alternator substantially comprises a housing 1, and, inside the latter, a claw rotor 2 which is integral in rotation directly or indirectly with a shaft 3, and a stator 4 which surrounds the rotor with the presence of a small air gap. The axis X-X of the shaft 3 constitutes the axis of rotation and axial symmetry of the rotary electrical machine, and thus the axis of the rotor 2. Hereinafter in the description, the orientations radial, transverse and axial should be considered relative to this axis X-X.

The stator 4 comprises a body in the form of a set of plates provided with notches, in this case of the semi-closed type, equipped with a notch insulator for fitting of the phases of the stator, each comprising at least one winding which passes through the notches in the body of the stator, and forms a chignon 5 on both sides of the body of the stator.

The windings are obtained for example from a continuous wire which is covered with enamel, or from conductive elements in the form of a bar, such as pins which are connected to one another for example by being welded.

These windings are for example three-phase windings which are connected in the form of a star or triangle, the outputs of which are connected to at least one rectifier bridge comprising rectifier elements such as diodes or transistors of the MOSFET type, in particular when an alternator-starter is involved, as described for example in document FR A 2 745 445 (U.S. Pat. No. 6,002,219).

The number of phases depends on the applications, and can be greater than three, one or two rectifier bridges being able to be provided as in document EP 0 881 752.

The claw rotor 2 (FIGS. 1 and 2) comprises two magnet wheels 7, 8 which are axially juxtaposed and have an annular form. Each wheel 7, 8 has a flange with transverse orientation which is provided on its outer periphery with teeth 9 with a trapezoidal form and axial orientation. The teeth 9 of one wheel face axially towards the flange of the other wheel with the tooth of one magnet wheel penetrating into the space which exists between two adjacent teeth 9 of the other magnet wheel, such that the teeth of the magnet wheels are imbricated.

The outer periphery of the teeth 9 has an axial orientation and defines, with the inner periphery of the body of the stator, the gap between the stator 4 and the rotor 2. The inner periphery of the teeth 9 is inclined. These teeth 9 are thinner at their free end.

The flanges of the wheels 7, 8 have an annular form and have on their outer periphery (FIG. 2) radial projections 19 which are connected by chamfers 119 to the teeth 9. These projections 19 form claws with the teeth 9. The number of teeth and projections depends on the applications, and in particular on the number of phases of the stator. In FIG. 2 eight teeth per magnet wheel are provided. As a variant, each wheel 7, 8 comprises six or seven teeth, A cylindrical core is interposed axially between the flanges of the wheels 7, 8. In this case, this core consists of two half-cores which each belong to one of the flanges.

This core bears on its outer periphery an excitation coil 10 which is wound in an insulator 11 interposed radially between the core and this coil 10.

This insulator 11 supports the coil 10. It can be seen in document EP 0881 752 (FIG. 1) and is described for example in document FR 2 612 349.

It is made of electrically insulating and mouldable material such as plastic material, whereas the magnet wheels 7, 8 and the core are made of metal, in this case of ferromagnetic material such as low-carbon steel. The shaft 3 is also made of metal, being of ferromagnetic material, such as steel, which is harder than the magnet wheels and the core of the claw rotor.

The insulator 11 is in the form of a bobbin. It comprises a tubular hub 110 with axial orientation, at the ends of which there are provided two annular cheeks 120, 130 which are perpendicular to the hub. The hub 110 is fitted on the core of the rotor 2. The inner periphery of the hub is in close contact with the outer periphery of the core. The cheeks 120, 130 with transverse orientation are adjacent to the projections 19 of the flanges respectively of the wheel 8 and the wheel 7. Slight axial play exists between the cheeks of the insulator 11 and the flanges in order to arrange the coil 10. As a variant, the cheeks are in contact with the projections. The size of the cheeks depends on the height of the projections 19 and the coil 10, and therefore on the number of turns of this coil.

The hub 110 makes it possible to isolate the coil 10 electrically relative to the core of the rotor 2, whilst the cheeks 120, 130 make it possible to isolate the coil 10 electrically relative to the flanges of the magnet wheels 7, 8.

The outer periphery of each cheek 120, 130 comprises a plurality of projecting petals respectively 121, 131, which are wider circumferentially than the base of the teeth. One of the cheeks has means for connection of the ends of the electrically conductive wire which is wound in the insulator 11, as can be seen in FIGS. 3, 6 and 8 of this document FR 2 612 349. The petals are deployed and have a globally radial orientation in the free state, i.e. before fitting of the insulator 11 between the flanges of the wheels 7, 8. They are slightly inclined axially in the free state, as can also be seen in FIG. 2 of document US 2003/0137208, according to the preamble of claim 1.

These petals 121, 131, are folded back when the insulator is fitted onto the core of the rotor 2 in order to co-operate with the inner periphery of the teeth 9 of the magnet wheels, in so as to isolate the coil 10 electrically relative to the teeth 9 and the projections 19. According to one embodiment, by means of the petals, the coil 10 can have the form of a barrel, as represented in broken outline in FIG. 1.

The housing 1 has the stator 4 on the interior of its outer periphery and the shaft 3 centrally in rotation. In this case, this housing comprises two perforated flanges 16, 17 which are known as the front bearing and the rear bearing. The front bearing 16 is adjacent to a pulley 12, whereas the rear bearing 17 supports the brush-holder, the voltage regulator, and at least one rectifier bridge. The bearings have a hollow form and each support centrally a ball bearing 19 and 20 respectively for fitting of the shaft 3 of the rotor 2 such that the shaft can rotate. The diameter of the bearing 19 is greater than that of the bearing 20.

The pulley 12 is secured to the front end of the shaft 3, in this case by means of a nut 160 which is supported on the base of the cavity of this pulley 12. This pulley 12 comprises a bush which is in contact with the inner ring of the bearing 19, An annular brace 159 is interposed axially between the front surface of the front magnet wheel 7 and the inner ring of the bearing 19. The shaft 3 passes through the brace 159 and the bush of the pulley 12.

In FIG. 1, on the outer periphery of the body of the stator 4. a resilient system is provided for filtering of vibrations, with a flat seal 40 at the front and buffers 41 at the rear, flexible thermally conductive resin being interposed between the front bearing and the body of the stator in order to discharge heat. As a variant, the bearings 16, 17 support the body of the stator 4 rigidly, without the presence of the seal 40 and the buffers 41.

The alternator in FIG. 1 is an alternator with internal ventilation, which, as in document EP 0 881 752, comprises front 16 and rear 17 bearings with air intake and air outlet openings in order to permit cooling of the alternator by circulation of air generated by the rotation of at least one internal fen which is integral with one of the axial ends of the rotor 2. In this case, a fan 23 is provided on the front frontal surface of the rotor, and another fan 24, which is more powerful, and in this case obtained by superimposition of two elementary fans with blades which are offset circumferentially, is provided on the rear dorsal surface of the rotor, each fan being provided with a plurality of blades 25, 26.

As a variant, the alternator comprises an external fan adjacent to the pulley, as in document DE 30 08 454. As a variant, the alternator is cooled by circulation of a fluid, such as the cooling water of the thermal engine of the vehicle, circulating in a channel provided in the housing 16, 17.

The front end of the shaft 3 supports the pulley 12 which belongs to a device for transmission of movements to at least one belt between the alternator and the thermal engine of the motor vehicle, whereas the rear end 13 with a reduced diameter of the shaft 3 supports collector rings which are connected by wired connections to the ends of the coil 10. In this case, the wired, connections and the collector rings belong to a collector of the type described in document FR 2 710 197. Brushes belonging to a brush-holder 14 are disposed such as to rub on the collector rings. The brush-holder is connected to a voltage regulator.

When the excitation coil 10 is supplied electrically by brushes, the rotor 2 is magnetised, and becomes an inductor rotor with formation of North-South magnetic poles at the level of the claws, and therefore the teeth of the magnet wheels.

This inductor rotor 10 creates an induced alternating current in the stator which is induced when the shaft 3 rotates, the rectifier bridge(s) making it possible to transform the alternating current induced into a direct current, in particular in order to supply the charges and consumers of the on-board network of the motor vehicle, as well as to recharge the battery of the said vehicle.

The performance, i.e. the power and output of the rotary electrical machine can be increased further by using a claw rotor which has the configuration according to FIG. 2. This rotor comprises permanent magnets 38 which are disposed symmetrically relative to the axis X-X of the rotor, and are interposed between two teeth 9 adjacent to the outer periphery of the rotor. These magnets 38 are known as inter-polar magnets since they intervene between two consecutive teeth which belong to one and the other of the magnet wheels.

In FIG. 2 there are provided four pairs of magnets 38 for eight pairs of poles. As a variant, the number of magnets is equal to the number of pairs of poles.

A magnet of this type is represented in FIG. 1, and can also he seen in FIG. 1 of document EP 0881 752.

The shaft 3 is rendered integral with the wheels 7, 8 directly in FIG. 1 by forcing projecting knurled portions of the harder shaft 3 into internal bores in the wheels 7, 8. The shaft 3 also has a smooth intermediate portion between the two knurled portions. One of the knurled portions is also used for securing of the brace 159.

The half-cores of the wheels 7, 8 are pressed against one another for good passage of the magnetic flow.

According to other documents, fitting of the shaft is carried out by deformation and creeping of material.

For example in document DE 300 84 54 (FIG. 4), the shaft has two grooves with a base with axial striations. The material of the magnet wheel flanges is deformed in order to creep into the striations of the grooves.

The same applies in document WO 2008/031995, but constructive measures have been taken to facilitate the machining, arrange the fitting areas of the bearings 19, 20, and reduce the diameter of the rear end of the shaft 3.

In FIGS. 1 to 7 of document DE 300 84 54, the core of the rotor is in a single piece which is interposed axially between the two flanges of the magnet wheels, whereas in document WO 2008/031995, the core is in two parts and the striations are longer.

According to another embodiment which is described in document WO 2006/103361, the magnet wheels are fitted indirectly onto the shaft by means of an intermediate sleeve or a shouldered core provided with support surfaces for fitting of the flanges of these wheels. At least one knurled section of the shaft is forced into the inner bore in the intermediate sleeve or the shouldered core, then the wheels are secured respectively on the sleeve or the flanges of the wheels on the core for example (FIGS. 3 and 5 of this document) by welding or crimping.

In document FR 2 612 349, in a first stage, a first one of the magnet wheels is forced onto the shaft, then in a second stage, the insulator equipped with its excitation coil is fitted onto the half-core, and finally, in a third stage, the second magnet wheel is fitted onto the knurled portion of the shaft.

A solution for fitting of the magnets, as described for example in applications FR 2 793 085 and FR 2 784 248, consists of fitting them after securing onto the shaft of the rotor equipped with its excitation coil, since in this case the petals are already bent such that no interference between the petals and the magnets need be feared when the magnets are finally fitted in machined grooves.

A problem arises when the magnets are fitted in advance on one of the magnet wheels, as described on page 10 of document WO 2008/031995, since the petals are initially deployed.

More specifically, as indicated on pages 23 and 24 of this document WO 2008/031995, machining is carried out in advance of the grooves for fitting of the magnets, the inner bore and outer periphery of the magnet wheels, using lubricated tools without risk of projection of shavings onto the coil 10 which is not present at this stage.

After, the insulator with its coil is fitted onto the half-cores of the magnet wheels, then, after angular positioning of the two wheels for example by means of fingers interposed temporarily between the projections of the magnet wheel concerned, by means of a compacting press the half-cores are pressed against one another for good passage of the magnetic flow. Then, the shaft is fitted into the central bores in the magnet wheels without destruction of the angular positioning of the magnet wheels, and finally, by means of a tool, the material of the magnet wheels is deformed for penetration into the areas of crimping, with striations, of the shaft.

Thus, the magnets are fitted in a groove which does or does not open out from a first magnet wheel, then the second magnet wheel is brought into the correct angular position, in the knowledge that it is possible to rotate this wheel without difficulty. During this stage, the second magnet wheel is brought axially towards the first magnet wheel, such that the ends of the magnets, supported by the first magnet wheel, can come into contact with the deployed petals of the cheek associated with the second magnet wheel, which is then spaced axially from the first magnet wheel.

More specifically, via their inclined inner periphery, the ends of the teeth of the second magnet wheel come progressively into contact with the petals of the cheek which is associated with the second wheel, in order to turn down, and therefore bend back, the petals of this cheek. These petals can therefore interfere with the magnets of the first wheel, which can lead to the magnets being placed aslant, such that they are liable to be broken subsequently when the two magnet wheels continue to be brought closer to one another axially, or when the two half-cores of the magnet wheels are brought into close contact under pressure, during the compacting operation.

In order to prevent this, it is conceivable to reduce the size of the petals in order to prevent any interference with the magnets when the two magnet wheels are brought axially closer to one another.

This solution is not satisfactory, since it is implemented to the detriment of the isolation of the excitation coil

OBJECT OF THE INVENTION

The object of the invention is to reconcile these two contradictory solutions.

An objective of the invention is thus to prevent any interference between the petals and the permanent magnets.

Another objective of the invention is thus to isolate the excitation coil well.

According to the invention, a claw rotor of the above-described type is characterised in that at least the petals of a cheek associated with the permanent magnets are in several parts, i.e. a main petal for co-operation with the inner periphery of a tooth of the magnet wheel concerned, and at least one lateral secondary petal which is lower, seen in the radial direction, than the main petal.

According to the invention a rotary electrical machine is characterised in that it is equipped with a claw rotor of this type secured to it.

By means of the invention, the main petal bends during the fitting of the insulator of the excitation coil into the magnet wheel, whereas the secondary petal does not bend, and protects the excitation coil without interfering with the magnet concerned.

In addition, these divided petals are easier to bend than the other petals.

Furthermore, it is possible to increase the thickness of the free end of the teeth which support the magnets, in order to increase the strength of these teeth, and therefore obtain better resistance to the centrifugal force.

Moreover, it is possible to decrease the size of the rotary electrical machine, and in particular the outer diameter of the claw rotor.

This solution also makes it possible to fit magnets into a support which is supported by the tooth concerned, since no interference need be feared, between the divided petal and the support for the magnet.

According to one characteristic, a slot is provided, between the secondary petal and the main petal.

This arrangement permits better separation of the secondary petal from the main petal, such that the bending of the main petal does not give rise to bending of the secondary petal According to one embodiment, all the petals of one cheek are divided into two parts.

This arrangement assists homogeneous bending of the petals.

According to another embodiment, the petals of the two cheeks are divided petals.

This arrangement makes it possible to avoid fitting errors concerning the position of the cheeks.

In fact, according to one embodiment, it is possible to retain the petals of one cheek and modify the petals of the other cheek. It is then necessary to avoid selecting the incorrect cheek.

In addition this makes it possible to fit the magnet on one or the other of the magnet wheels.

Other objectives, characteristics, details and advantages of the invention will become more clearly apparent during the following explanatory description given with reference to the attached drawings, which are provided purely by way of example to illustrate the embodiments of the invention.

DESCRIPTION OF EMBODIMENTS OF THE INVENTION

In the figures identical elements will be allocated the same reference signs. As previously stated, the orientations radial, transverse and axial are to be considered relative to the axis X-X in FIG. 1.

Figure 1:
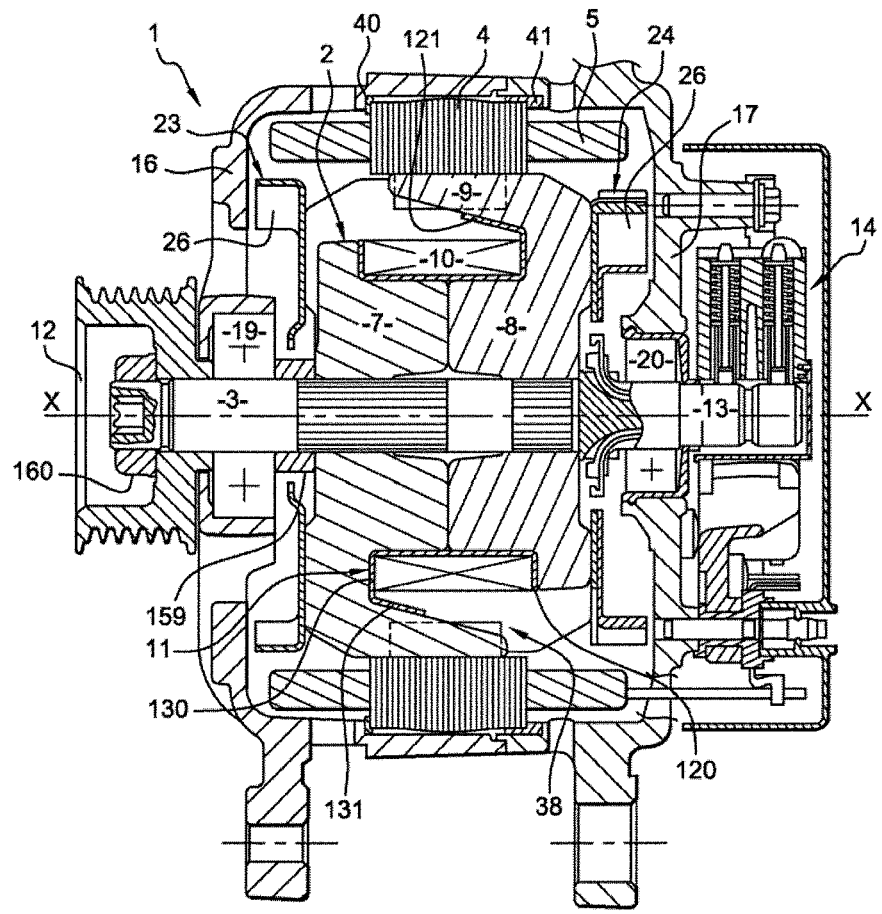
FIG. 1 is a view in axial cross-section of a rotary electrical machine according to the prior art.
Figure 6:
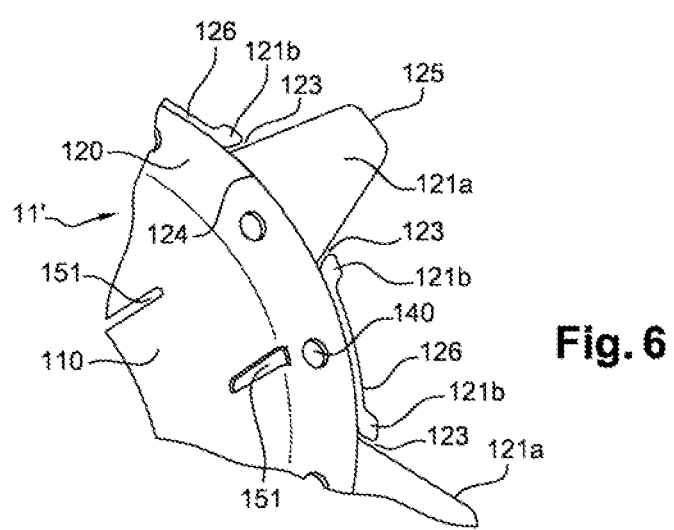
FIG. 6 is a partial view in perspective showing a divided petal according to the invention.
Figure 7:
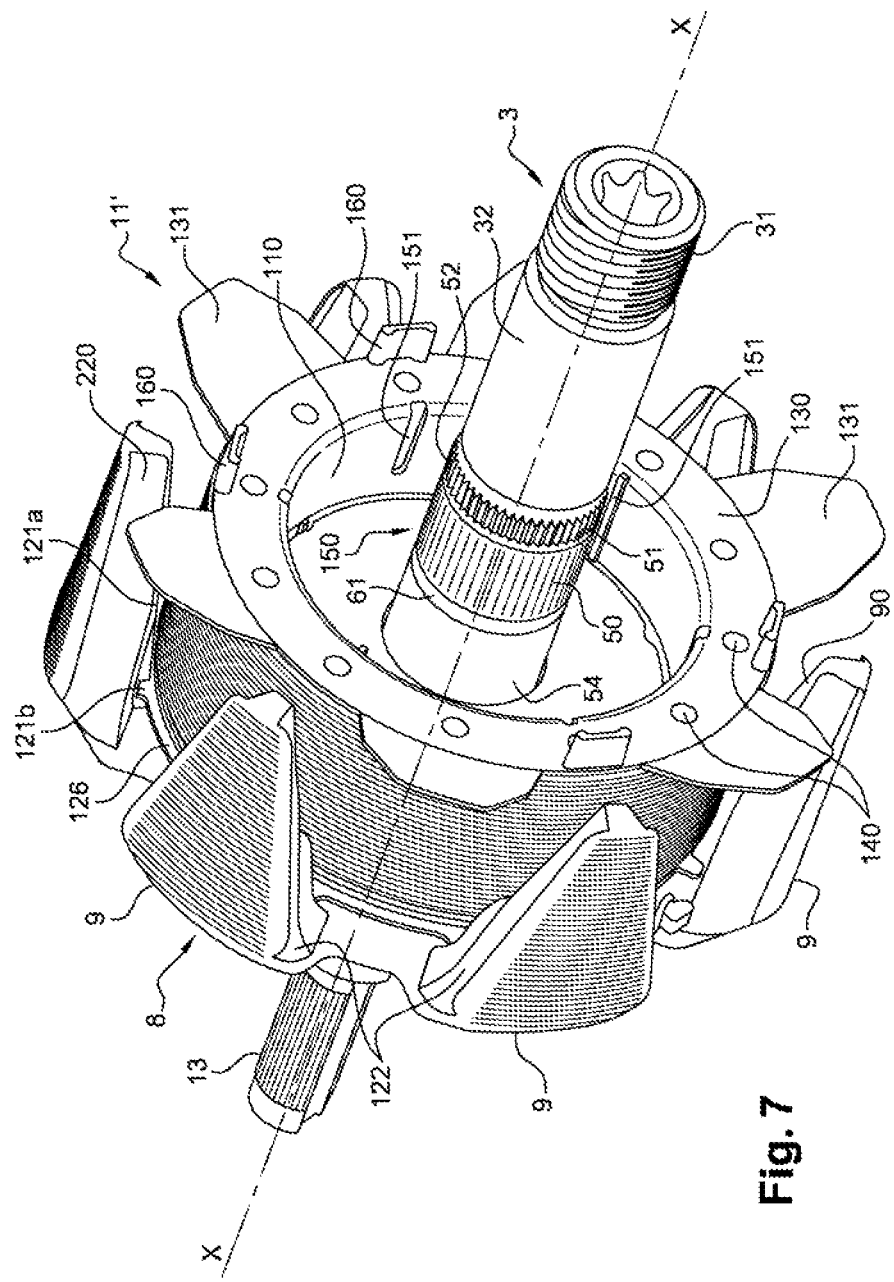
FIG. 7 is a view in perspective of a claw rotor according to the invention without its front magnet wheel and without its permanent magnets, in order to see better the deployed petals of the front cheek of the insulator of the excitation winding, and in order to see one of the divided and bent petals according to the invention.
Figure 8:
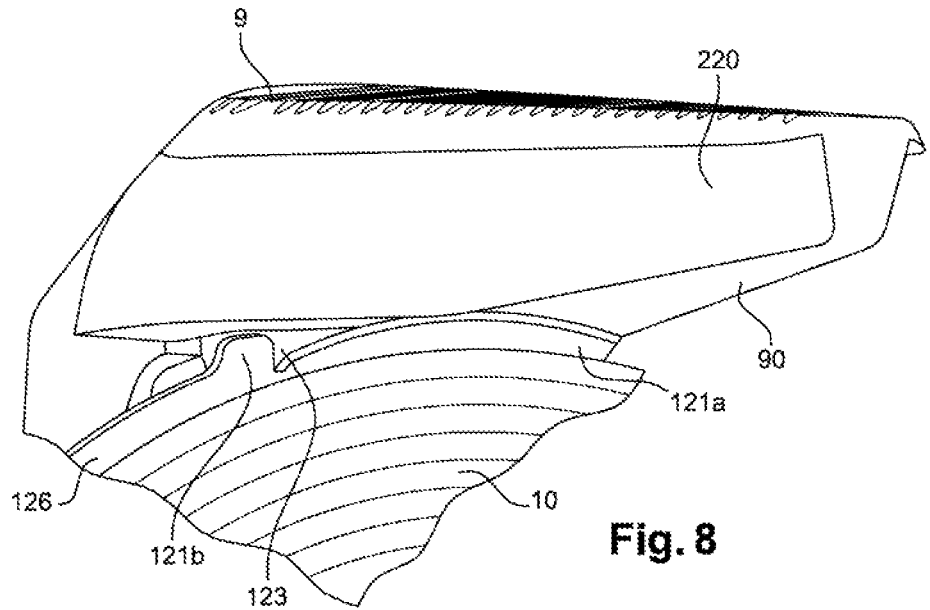
FIG. 8 is a partial view on an enlarged scale of FIG. 7, in order to see better the co-operation of a petal according to the invention with the inner periphery of a tooth of the rear magnet wheel.

In FIGS. 6 to 8 the insulator 11' according to the invention is shown in place of, and in the position of the insulator 11 in FIG. 1, the alternator or alternator-starter being of the type indicated in the prior art.

The insulator 11' is thus shown on the core of the claw rotor 2 with an annular form and an axial axis of symmetry X-X, between the two flanges of the magnet wheels, with a tooth 9 of a flange of one magnet wheel facing the flange of the other magnet wheel.

The insulator 11' in these FIGS. 6 to 8 has the same structure as the insulator 11, i.e. it is made of electrically insulating material, in this case of plastic material, and is in the form of a bobbin with a cylindrical sleeve 110 with axial orientation, which is provided, at each of its axial ends with a cheek 120, 130 with transverse orientation as in FIG. 1.

The sleeve 110 is thus shown centred on the core of the claw rotor 2, whereas the cheeks 120, 130 are each designed to be adjacent, or even to come into contact with one of the flanges of a magnet wheel.

Preferably, slight fitting play exists between the cheeks and the flanges of the wheels.

The coil 10 is wound in this insulator 11', which acts as a support for this coil.

In FIGS. 6 and 7, the cheeks 120 and 130 each have a plurality of holes, 140, whereas the sleeve 110 has a plurality of blind grooves 151 which are offset circumferentially for securing of the cheeks 120, 130 respectively, by means of resin or another glue, onto the flange and onto the half-core of the magnet wheel 8, 7 concerned.

In FIG. 7, 160 shows projections with axial orientation which belong to the cheek 130, and are designed to co-operate with the base of two adjacent projections 19 of the front magnet wheel 7, for blocking in rotation of the insulator 11'.

It will be appreciated that this blocking in rotation is carried out as a variant as in document FR 2 612 349, with the inner periphery of the hub 110 and the outer periphery of the half-cores of the rotor 2 having a polygonal form.

Each cheek 120, 130 has projecting petals which, in the initial state, i.e. in the free state, are deployed and have a globally radial orientation. These petals are inclined slightly axially initially in the direction of the magnet wheel concerned, as can be seen in FIG. 7. The petals are formed such as to be turned down and bent back in order each to come into contact with the inner periphery 90 of a tooth 9 of the rotor 2. The circumferential width of the base of a petal is greater than the circumferential width of the adjacent projection 19.

According to the invention, at least some of the petals are modified, in the manner described hereinafter, taking into account the presence of the inter-polar permanent magnets 38 which are supported, by claws 19, 9 directly or indirectly, for example via a support.

The teeth 9 with axial orientation at their outer periphery, and with a trapezoidal form, are configured for the fitting of the inter-polar magnets 38.

According to one embodiment (FIGS. 3 and 4), at least one tooth 9 of the rear magnet wheel 7 comprises two grooves 122, whereas the adjacent tooth 9 of the front magnet wheel 7 has at least one groove 122.

This depends on the number of pairs of magnets, which can be lower than the number of pairs of poles, such that one tooth 9 of the wheel 7 may have only one groove. As a variant, this tooth 9 has two grooves.

Each groove 122 has a profile in the form of a "U", and is provided in a lateral surface 220 of a tooth. These lateral surfaces 220 are inclined, as can be seen in FIGS. 7 and 8. The surfaces 220 connect the outer periphery with axial orientation of a tooth 9 to the inclined inner periphery 90 of this same tooth 9.

The grooves 122 are grooves for receipt of the permanent magnets 38, which are for example of the rare earth or ferrite type.

The inner periphery 90 of the teeth 9 is also inclined. The teeth 9 are thicker at their base, i.e. at the level of their area of connection to the projections 19 of the flanges of the wheels 7, 8, than at their free end. The number of teeth with grooves depends on the number of magnets. As a variant, all the teeth 9 have grooves.

Figure 3:
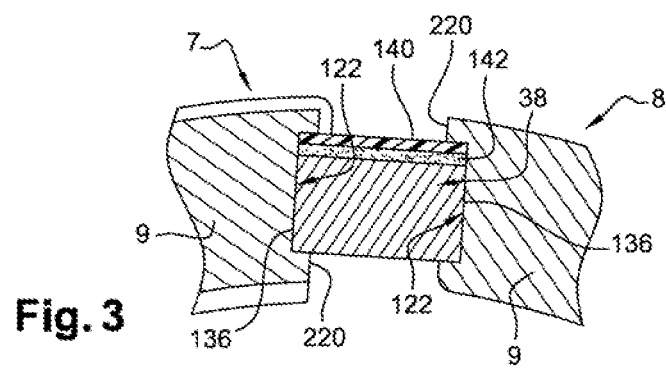
FIG. 3 is a partial view in transverse cross-section of the fitting of one of the inter-polar magnets between two adjacent teeth which belong respectively to one and the other of the magnet wheels in FIG. 2.

The grooves 122 have a flat base and two perpendicular edges (FIG. 3). The permanent magnets 38 in this case have a globally parallelepiped form, and are fitted in grooves 122, whilst having dimensions in accordance with the grooves, in order to penetrate into the latter.

These grooves 122 (FIG. 4) are closed at 230 at the base of a tooth 9 of the wheel 8, and open at 128 at the free end of this tooth 9.

As far as the adjacent tooth 9 of the wheel 7 is concerned, the groove 122 is closed as 230 at the level of the free end of the tooth 9, and is open at 128 at the base of this tooth 9.

Figure 4:
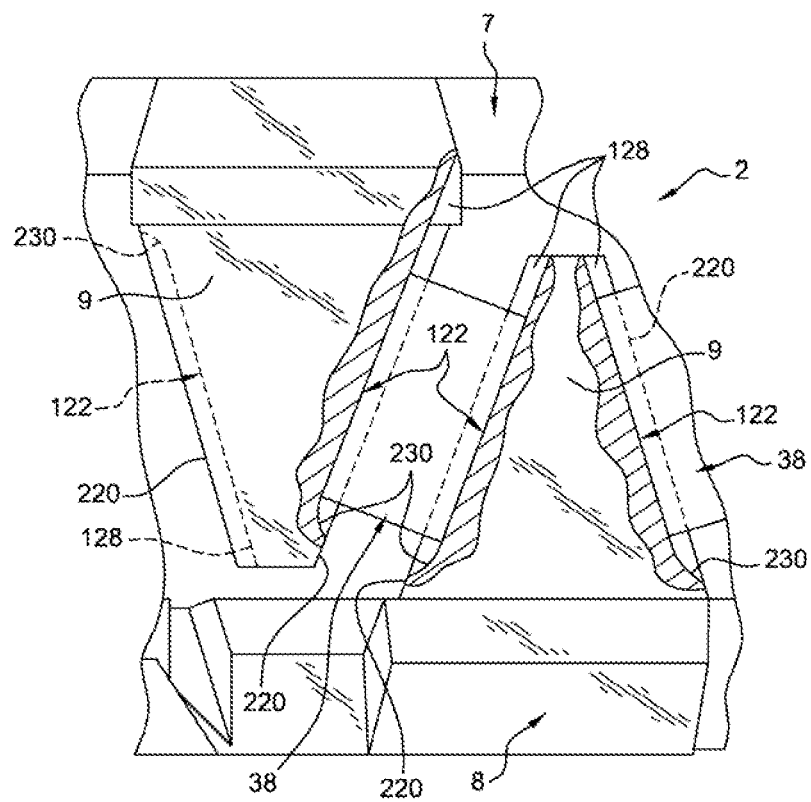
FIG. 4 is a partial view from above of two adjacent teeth in FIG. 2, with a part in cross-section of the teeth in order to show the form of the fitting grooves of an inter-polar magnet.
Figure 5:
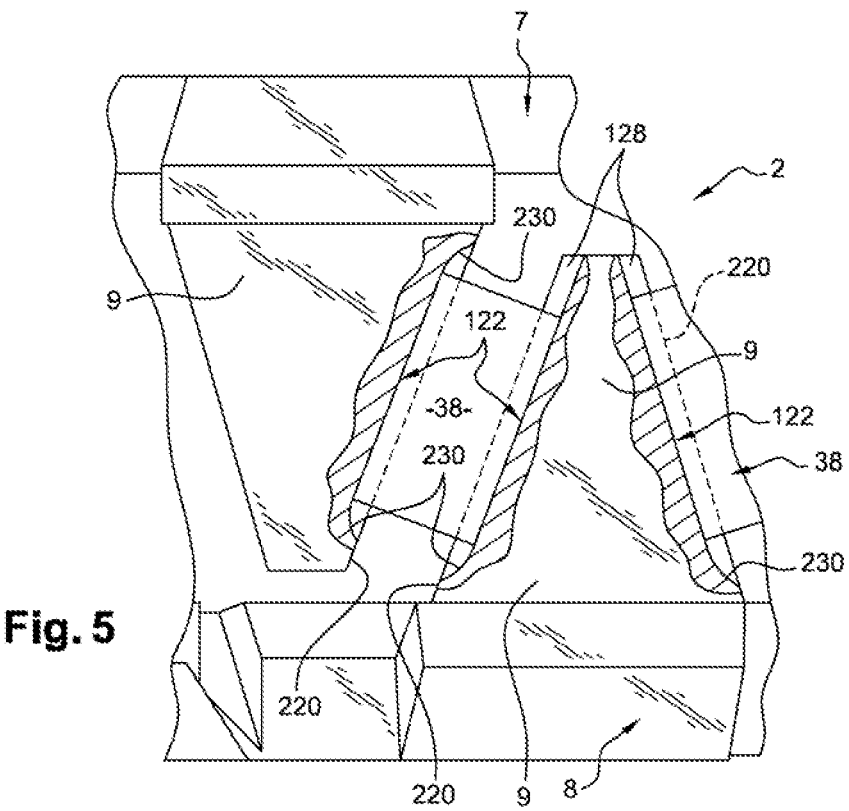
FIG. 5 is a view similar to FIG. 4 in order to show a variant embodiment of the form of a fitting groove of an inter-polar magnet.

It will be appreciated that it is possible to invert the structure as shown in the left part of FIG. 4, with the groove 122 in the tooth 9 of the front magnet wheel 7 being closed at 230 at the level of the base of this tooth 9, and open at 128 at the free end of this tooth 9. As a variant, as can be seen in FIG. 5, the groove 122 in the tooth 9 of the wheel 7 is closed, at 230 at each of its ends, i.e. at the base and at the free end of this tooth 9.

All of this is possible since the magnet wheels and the grooves 122 are advantageously machined in advance in the aforementioned manner, i.e. before fitting of the magnets 38, the isolator 11' equipped with the excitation coil 10 and the magnet wheels 7, 8 on the shaft 3, directly or indirectly. It is possible to rotate the wheels relative to one another before securing the shaft, in order to bring them into the correct position.

Thus, the grooves 122 concerned of each wheel 7, 8 are machined in advance by means of a tool, such as a milling cutter, i.e. before the excitation coil 10 is fitted between the flanges of the magnet wheels and on the core, such that shavings are not liable to damage this excitation coil, which is not present at this stage.

The size of the milling cutter used for machining of the grooves in the magnets is not limited, since in this stage the magnet wheels are machined, independently.

In this case, the outer periphery of the teeth comprises furrows (without a reference) in order to decrease Foucault currents in the stator. These furrows are machined in advance.

Figure 9:
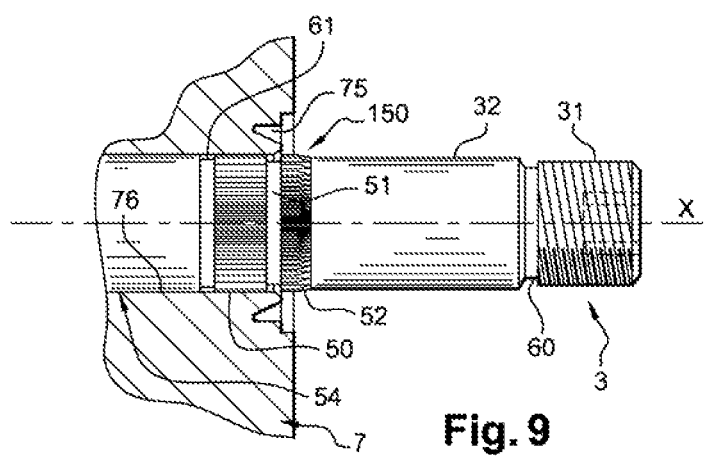
FIG. 9 is a partial view in axial cross-section of the claw rotor equipped with the shaft in FIG. 7, before the operation of crimping of the rotor onto the front crimping area of this shaft.

In FIGS. 7 to 9 the magnet wheels are secured to the shaft 3 by deformation of material of the wheels, the shaft 3 being of the type in FIGS. 3 or 10 of document WO 2008/031995. For the sake of simplicity the references of this document will be reused.

The front part of the shaft 3 thus comprises a first threaded section 31 for screwing of the nut 160 in FIG. 1, a groove 60, and a second smooth section 32 with a diameter larger than the section 31 for fitting of the inner ring of the front bearing 19. The section 32 is extended at the rear by a crimping area 150 with a diameter which is larger than the diameter of the area 32. The area 150 is divided into two parts 50, 52 by a crimping groove 51, which permits creeping of the material of the front magnet wheel. A groove 61 separates the part 50 from a centring area 54 with a diameter larger than the diameter of the crimping area 150. The parts 50, 52 are parts with striations with axial orientation. The area 54 is a centring area for the half-cores of the magnet wheels which are in close contact at their inner periphery with the outer periphery of the area 54. This area 54 is extended at the rear by a second crimping area comprising a part with striations with axial orientation or with crossed striations, as shown respectively in FIGS. 3 and 10 of this document WO 2008/031995.

It will be appreciated that as a variant it is possible to use a shaft with two crimping areas with crossed striations, as in FIG. 6 of this document.

In FIG. 7, 13 shows the rear end with a reduced diameter of the shaft 3. This end 13 is knurled in this case for fitting of the added-on collector of the type according to document FR 2 710 197, to which reference will be made.

In FIG. 9, 75 shows an indentation with an annular form, which is optionally divided into fractions, provided in the front wheel. The rear wheel also has an indentation of this type. The indentation 75 is configured for the receipt of a tool with a form complementary to the indentation. As described in this document WO 2008/031995 (FIGS. 5 to 9) by means of a tool, which as a variant itself produces the indentation, the material of the magnet wheel is thrust back in order to make this material creep into the interior towards the crimping area concerned, and towards the associated crimping groove, in order to secure the magnet wheel concerned.

This operation is carried out finally after the operations of machining of the magnet wheels, fitting of the insulator of the excitation coil onto the half-cores, and the operation of compacting, with the possibility of rotation of the wheels relative to one another.

Thus, according to once embodiment, the magnets are designed to be fitted firstly on the teeth of the front magnet wheel 7, the teeth concerned of which have grooves 122 of the type in FIGS. 4 and 5.

In this embodiment, with the grooves 122 already having been machined, in the wheels 7, 8, the insulator 11' equipped with the excitation coil is fitted onto the half-core of the wheel 7. During this stage, the petals 131 of the front cheek 130 are turned down and bent back progressively by contact with the inclined inner periphery of the teeth 9. These petals go from their deployed position which can be seen in FIG. 7, to their folded back position which can be seen in FIG. 1. These petals 131 are wider circumferentially at their base than the projections 19 of the transverse flange and the base of a tooth 9 of the front wheel 7. In a second stage the magnets 38 are inserted axially into the grooves 122 in the teeth of the wheel 7 from the front rearwards, with the open ends 128 at the base of the teeth 9 making this possible. The movement is limited as a result of the presence of the closed end at 230 of the groove 122 at the level of the front end of the tooth 9 of the wheel 7, as can be seen in FIG. 4. During this fitting, the petals 131 do not constitute an obstacle since they are folded back.

As a variant, as can be seen in FIG. 5, the grooves 122 are closed at 230 at each of their ends.

The fitting of the magnets thus being carried out laterally is possible taking into account the fact that the rear wheel 8 is not present.

As a variant, as can be seen in the left part of FIG. 4, the magnets are inserted from the rear forwards into the grooves 122 in the wheel 7 which are open at 128 at the level of the free end of the teeth, and closed at 230 at the level of the base of the teeth 9.

Then, the rear magnet wheel 8 with its teeth machined as in FIG. 4 is brought axially towards the front wheel 7 equipped with the magnets 38 and the insulator 11' in which the coil 10 is wound. During this axial bringing together, the petals of the rear cheek 120 are not yet bent back (see FIG. 6). These petals may interfere with the magnets 38 when they are bent back progressively by contact with the inclined inner periphery of the teeth 9 of the wheel 8. Finally, the magnet wheels are secured to the shaft 3 so that the shaft 3 is fitted into central bores in the magnet wheels 7 and 8 (such as a central bore 76 in the magnet wheel 7, shown in FIG. 9), for example as in document WO 2006/103361.

According to another embodiment, the inverse is carried out, and the insulator 11' equipped with the coil 10 is fitted onto the half-core of the wheel 8, and finally the front wheel 7 is brought towards the rear wheel, and this wheel 7 is ultimately secured directly or indirectly on the shaft. In this case, the structures are inverted, with the grooves 122 in the wheel 8 having the form of the grooves in the wheel 7 in FIG. 4 or FIG. 5, whereas the grooves 122 in the wheel 7 have the form of the grooves in the wheel 8.

The petals 131 of the front cheek 130 may interfere with the magnets 38.

In these embodiments, as can be seen in FIG. 3 and as described in the aforementioned, document FR 2 784 248, at least one plate 140, known as the laminate, made of a material which is softer than the magnet 38, such as pre-impregnated plastic material in which glass fibres are embedded, is interposed between the magnet and each of the grooves 122. A more flexible layer of glue 142 is interposed between the magnet 38 and the plate 140.

According to one embodiment, the plate 140 is based on Mylar (registered trade mark).

As a variant, another layer and another plate are provided, as in FIG. 3 of this document FR 2 784 248. The lateral edges of the magnets can if necessary be coated with a layer of glue 136 in order to be secured at the base of the groove 122.

As a variant, this groove is in the form of a V, as can be seen in FIG. 5 of this document FR 2 784 248.

A groove 122 thus comprises a base and at least one lower edge. This lower edge is axially shorter than the upper edge in the embodiment in FIG. 7.

As a variant, the magnet is in two parts as in FIG. 4 of this document FR 2 784 248.

It is therefore possible to fit the magnets 38 in different ways firstly on one magnet wheel, and then bring the other magnet wheel towards it.

According to yet another embodiment, the magnets are secured on the teeth 9 indirectly by means of a support, as in document U.S. Pat. No. 6,369,485. These magnets are secured on both sides of a tooth of a magnet wheel by means of a support which is in contact with the tooth concerned, and is provided, with receptacles for the magnets, as can be seen in FIGS. 1 to 12 of this document, to which reference will be made.

As a variant, when the number of pairs of magnets is lower than the number of pairs of poles, at least one of the teeth 9 bears a support which is provided with a single receptacle for a magnet.

In these cases, the support for at least one magnet can prevent the petal concerned from bending.

In all cases the magnets 38 are therefore supported directly or indirectly (via a support) by the teeth 9 of the magnet wheel concerned.

According to the invention, the insulator 11' is configured such that the petals which are associated with the magnets can bend without interfering with the magnets and/or the supports for the magnets.

According to the embodiment in FIGS. 6 and 7, the petals 131 of the front cheek 130 are retained, whereas the petals of the rear cheek 120 which are associated with the rear wheel 8 are modified in order to be able to bend well, and not interfere with the magnets 38 and/or the supports for the magnets, which according to this embodiment are supported by the grooves in the teeth 9 of the front magnet wheel 7.

According to the invention, at least some of the petals of a cheek 120, 130 are divided into two parts.

Figure 2:
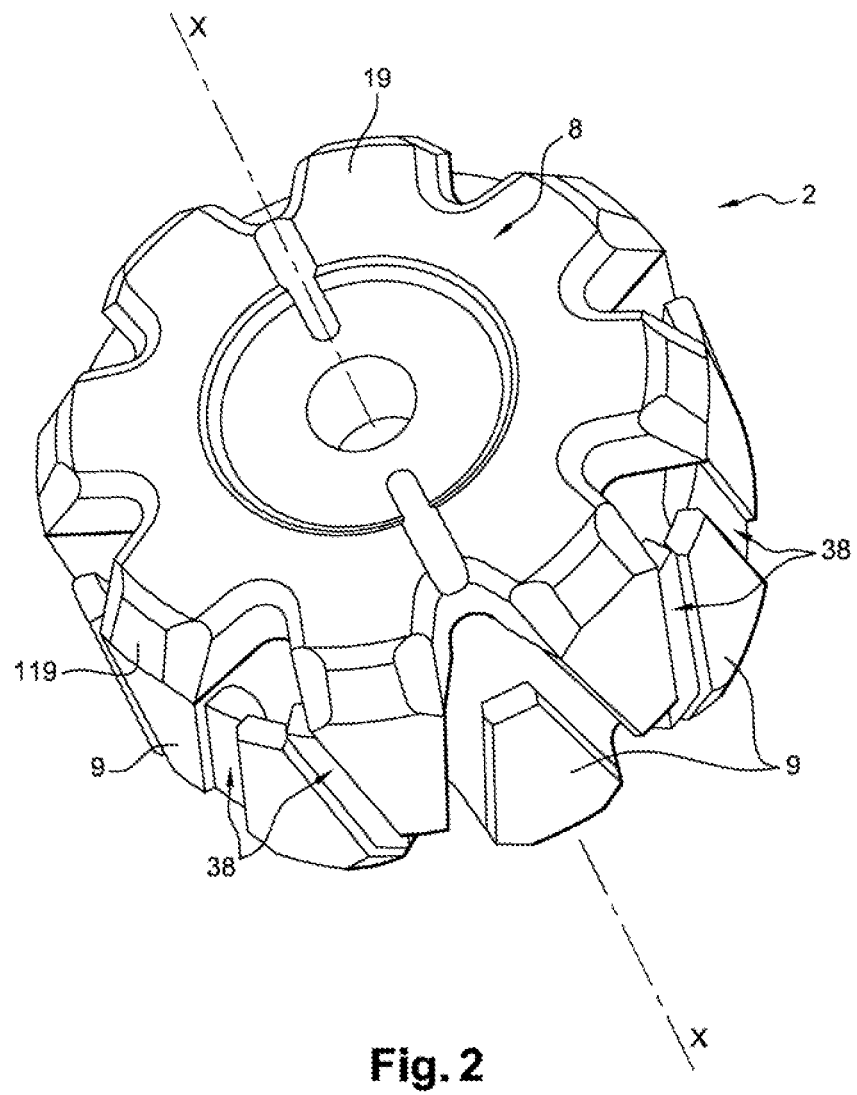
FIG. 2 is a view in perspective of the claw rotor in FIG. 1 equipped with permanent magnets in order to increase the power of the machine.

More particularly, according to one embodiment, with the number of pairs of magnets being lower than the number of pairs of poles, as in FIG. 2, there is modification and division into two only of the petals which are firstly associated with the inner periphery of the teeth of a first magnet wheel, and secondly opposite a pair of magnets which are supported directly or indirectly by a tooth of the other magnet wheel.

The other petals are retained and preferably have the same form as the petals 131.

According to another embodiment, all the petals which are associated with the teeth of the first magnet wheel are modified.

This arrangement makes it possible to standardise the petals. In addition, it makes it possible to obtain more homogeneous bending of the petals, in the knowledge that the petals which are divided into two are easier to bend because of their configuration described hereinafter.

In FIGS. 6 to 8. this divided petal belongs to the rear cheek 120. and comprises a main petal 121a and at least one lateral secondary petal 121b which is lower, seen in the radial direction, than the main petal 121a.

In fact, taking into account that according to one embodiment, the number of pairs of magnets 38 is lower than the number of poles, a divided petal may be opposite only one magnet 38 which is supported by a tooth 9 of the front magnet wheel 7. such that a single secondary petal is necessary.

It will be appreciated that, as a variant, when a tooth of the other magnet wheel supports a magnet 38 on each of its lateral surfaces, a secondary petal 121b is provided on both sides of a main petal 121a.

These petals 121a and 121b are separated from one another by a slot 123 (FIG. 6), which makes it possible to make the secondary petal 121b more independent, since it is not influenced by the bending of the main petal 121a.

According to the embodiment in FIGS. 6 to 8, a lateral secondary petal 121b is provided on both sides of a main petal 121a. A strip of material 126 connects two consecutive petals 121b. This strip 126 and these two petals 121b are circumferentially interposed, between two consecutive teeth 9 of the wheel 8. One of the petals 121b is adjacent to one of the lateral surfaces of a tooth 9 of the wheel 8, whereas the other petal 121b is adjacent to the lateral surface of the other consecutive tooth 9 of the wheel 8.

The petals 121b project globally radially in the free state relative to the strip of material 126 in the form of an annular segment. The strip of material 126 is connected to the outer periphery of the cheek 120, and makes it possible to stabilise the petals 121b and make them less sensitive to the deformations of the main petals 121a. In addition, this assures good protection and good electrical insulation of the coil 10.

The main petal 121a, which projects globally radially in the free state, whilst being inclined axially in the direction of the magnet wheel 8 concerned in the above-described manner, in this case has a globally trapezoidal form. Its large base 124 is connected to the outer periphery of the front cheek 120 with transverse orientation, such that it is rooted in this front cheek 120. The angle of inclination of a petal 121a in the free state relative to a transverse plane is in this case globally 10°. This angle depends on the applications, and makes it possible to wind the coil 10 well without being impeded by the petals 121a.

Its small base 125 is configured to be brought by bending into contact with the inner periphery of the tooth concerned.

The size (the dimension) of the petal 121a depends on the size (the dimension) of the inner periphery 90, which is inclined and globally has a trapezoidal form, of the tooth 9.

The width of the bases 124, 125 is determined by the dimension of the inner periphery 90 of the tooth 9.

This depends on the applications. As can be seen in FIG. 8, the size of the petal 121a is determined such that this petal ultimately covers at least part of the inner periphery 90 of the tooth 9, preferably without extending beyond the contour of this periphery 90.

This petal 121a shields the base of this tooth 9, and is easier to bend than the petal 131, since its base 124 is narrower circumferentially than the base of the petal 131. According to one embodiment, its small base 125 has a circumferential width which is globally equal to that of the small base of the petal 131, which also has a globally trapezoidal form.

The secondary petals 121b have a height, seen in the radial direction, which is lower than the height, seen in the radial direction, of the main petal 121a.

The radial height of the petal 121b depends on the radial distance relative to the axis X-X of the lower edge of the notch 122, or the radial distance relative to the axis X-X of the inner periphery of the support for the magnets, for example of the type in FIGS. 1 to 12 and 19 of document U.S. Pat. No. 6,369,485.

More specifically, the upper edge of the petal 121b is in this case implanted on a circumference which firstly has a radius smaller than the radial distance from the lower edge of the groove 122 to the axis X-X, and secondly a radius which is larger than that of the outer periphery of the strip of material 126.

Since as a variant the groove can be in the form of a "V", in all cases the secondary petal 121b is closer to the axis X-X of the rotor 2 than the lower edge of the groove 122.

Moreover, since as a variant the associated tooth of the other magnet wheel bears a support for at least one magnet, in all cases the secondary petal 121b is closer to the axis X-X than the support for the permanent magnet 38.

In this case the height, seen in the radial direction, of the petal 121b, is a third lower than the height, seen in the radial direction, of the main petal 121a.

The petals 121b are implanted at the base of the teeth 9, adjacent to the associated projections 19 of the flange of the wheel 8, and more specifically at the inner surface of the projections 19, which in this case face the flange of the wheel 7.

The secondary petals 121b project circumferentially relative to the base of the tooth 9 (FIG. 8).

The petals 121b, in combination with the strip 126, thus permit good electrical insulation of the coil 10 relative to the projections 19 and to the base of the teeth 9.

The petals 121a isolate the coil 10 electrically relative to the inner periphery of the teeth 9.

Taking into consideration a divided petal comprising a main petal 121a and two secondary petals 121b which are disposed on both sides of the main petal with the presence of slots 123 between each petal 121b and the lateral edge concerned of the petal 121a, the circumferential width of this divided petal is globally equal to the circumferential width of the large base of the petal 131.

It will be appreciated that when the structures are inverted and the magnets are fitted firstly on the rear magnet wheel 8, the front cheek 130 is equipped with the divided petals according to the invention.

According to one embodiment, the petals 131 are also modified.

Thus, as a variant, the petals 131 are replaced by divided petals 121a, 122b with slots 123. In this case, the petals are inclined in the direction of the magnet wheel 7, the angle of inclination relative to a transverse plane in this case being 10°.

This makes it possible to standardise the insulator 11' and to prevents errors of fitting, and in particular of inversion. More specifically, when the magnets 38 are fitted firstly on the front wheel 7, this prevents erroneous association of the divided petals with this wheel and of the petals 131 with the rear wheel.

This standardised, insulator is suitable for fitting of the magnets 38 in advance onto either of the wheels 7, 8. It will be appreciated that finally, it is possible to fit the shaft onto an intermediate sleeve or a shouldered core in order to create a sub-assembly, and then assemble the magnet wheels of this sub-assembly as described, in the aforementioned document WO 2006/103361.

As a variant, in the light of document DE 30 08 454, the core can be in a single piece, and it is possible to fit the magnets onto one of the wheels, and then bring towards one another the core equipped with the insulator 11' provided, with the coil 10. and finally the second magnet wheel. Finally, the shaft is secured by creeping of material of the flanges of the magnet wheels, as for example in FIGS. 6 and 7 of this document.

This insulator 11' for support of the excitation coil 10 wound in the insulator, which in FIGS. 6 to 9 according to the invention is in the form of a bobbin, can thus be fitted in the place and position of that in documents WO 2008/031995, WO 2006/103361 and DE 30 08 454, thus permitting prior machining of the magnet wheels and prior fitting of the magnets.

The insulator 11' according to the invention makes it possible to carry out the assembly steps in a different manner, taking into consideration the embodiments in documents WO 2008/031995, WO 2006/103361 and DE 30 08 454.

For example, the configuration of the insulator 11' makes it possible to fit in advance the magnets, the number of which depends on the applications, onto a first one of the machined wheels 7, 8.

Subsequently, the second wheel is secured to the shaft, and the insulator 11'-coil 10 assembly is then fitted onto the half-core of this wheel.

Then, the first wheel with magnets is brought axially towards the second wheel and the assembly 11'-10, in the correct position for carrying out compacting of the half-cores. Finally, this first magnet wheel is secured.

It will be appreciated that as a variant, it is possible to fit finally the magnets onto the wheels secured to the shaft.

According to yet another variant, the shaft has a projecting knurled portion and a crimping area.

Thus, the magnets are fitted in advance onto a first one of the machined wheels 7, 8.

Subsequently, the second wheel is secured to the knurled portion of the shaft, and the second wheel is machined, in particular the grooves for fitting of the magnets and the outer periphery of this wheel.

Then, the insulator 11'-coil 10 assembly is fitted onto the half-core of this wheel.

Subsequently, the first wheel with magnets is brought axially towards the second machined wheel and the assembly 11'-10, in the correct position for carrying out compacting of the half-cores.

Finally, this first magnet wheel is secured on the crimping area of the shaft by deformation of material of this second wheel.

It will be appreciated that it is possible to decrease the outer diameter of the rotor by means of the insulator 11'.

In addition, many direct or indirect types of fitting of the magnets onto the teeth of the magnet wheels can be envisaged.

In addition, it is possible to increase the thickness of the teeth, and therefore the axial length of the lower edge of the grooves 122.

In the embodiment represented in the figures, the insulator 11' is continuous. As a variant, as described in the aforementioned document US 2003/0137208, it is split.

The invention claimed is:

1. A claw rotor (2) for an alternator or alternator-starter of a motor vehicle, the rotor comprising;
   an axis of axial symmetry (X-X);
   two magnet wheels (7, 8) each comprising a flange bearing projections (19) extended by teeth (9) with axial orientation facing towards the flange of the other magnet wheel (8, 7);
   a core interposed between the flanges of the magnet wheels (7, 8);
   an insulator (11') for an excitation coil (10) fitted on the core and permanent magnets (38) fitted between two adjacent teeth (9) belonging to one and the other of the magnet wheels (7, 8);
   the insulator (11') comprising a hub (110) fitted onto the core, and a cheek (130, 120) at each of the ends of the hub (110), each cheek (120, 130) supporting a plurality of projecting petals (121, 131) designed to co-operate with an inclined inner periphery (90) of one of the teeth (9);
   the petals of one cheek (120, 130) are associated with the permanent magnets (38) and are divided into a plurality of parts;
   the plurality of parts comprising a main petal (121a) for co-operation with the inner periphery (90) of the tooth (9) of the magnet wheel (7, 8) and at least one lateral secondary petal (121b), both extending radially outwardly;
   a height in the radial direction of the at least one lateral secondary petal (121b) is lower, than a height in the radial direction of the main petal (121a).

2. The rotor according to claim 1, wherein the at least one slot (123) separates the main petal (121a) from the secondary petal (121b).

3. The rotor according to claim 2, wherein the plurality of parts comprises at least two secondary petals (121b) provided on both sides of the main petal (121a), with intervention of a slot (123) between each secondary petal (121b) and the main petal (121a).

4. The rotor according to claim 3, wherein a strip of material (126) connects to one another two secondary petals (121b) which are interposed circumferentially between two consecutive teeth of a single magnet wheel (7, 8).

5. The rotor according to claim 4, wherein the secondary petals (121b) project relative to the strip of material (126), which is connected to an outer periphery of the cheek (120) concerned.

6. The rotor according to claim 1, wherein the size of the main petal (121a) is determined by the dimension of the inner periphery (90) with a generally trapezoidal form of the tooth (9) concerned.

7. The rotor according to claim 6, wherein the main petal (121a) has a generally trapezoidal form and is provided with a small base (125) which is configured such as to come into contact with the inner periphery (90) of the tooth (9) concerned, and wherein the large base (124) of the main petal (121a) is connected to the outer periphery of the cheek (120) concerned.

8. The rotor according to claim 1, wherein the lateral secondary petal (121b) is implanted at a base of the tooth (9), and projects circumferentially relative to the base of this tooth (9).

9. The rotor according to claim 8, wherein the tooth (9) concerned comprises laterally a groove (122) with a lower edge, and wherein the secondary petal (121b) is closer to the axis (X-X) of the rotor (2) than the lower edge of the groove (122).

10. The rotor according to claim 9, wherein the tooth concerned of the other magnet wheel (8, 7) bears a support for fitting of at least one magnet (38), and wherein the secondary petal (121b) is closer to the axis of the rotor than the support for the magnet (38).

11. The rotor according to claim 1, wherein all the petals (121a, 121b) of a single cheek (120, 130) are divided into two parts.

12. The rotor according to claim 1, wherein all the petals (121a, 121b) of the two cheeks (120, 130) are divided into two parts.

13. A rotary electrical machine, comprising a claw rotor according to claim 1.

14. The rotary electrical machine according to claim 13, wherein said machine includes an alternator or an alternator-starter.

15. The rotary electrical machine according to claim 13, wherein the magnet wheels (7, 8) are fitted directly on a shaft (3) which has crimping areas (150) for this purpose.

16. The rotary electrical machine according to claim 13, wherein the magnet wheels (7, 8) are fitted indirectly on a shaft (3).

* * * * *